(12) United States Patent
Balan

(10) Patent No.: US 11,780,560 B2
(45) Date of Patent: Oct. 10, 2023

(54) ADAPTIVE DUCTED FAN PROPULSION SYSTEM

(71) Applicant: Alexandru Balan, Chicago, IL (US)

(72) Inventor: Alexandru Balan, Chicago, IL (US)

(73) Assignee: Alexandru Balan, Chicago, IL (US)

( * ) Notice: Subject to any disclaimer, the term of this patent is extended or adjusted under 35 U.S.C. 154(b) by 0 days.

(21) Appl. No.: 17/642,457

(22) PCT Filed: Sep. 11, 2020

(86) PCT No.: PCT/US2020/050507
§ 371 (c)(1),
(2) Date: Mar. 11, 2022

(87) PCT Pub. No.: WO2021/050952
PCT Pub. Date: Mar. 18, 2021

(65) Prior Publication Data
US 2022/0219806 A1    Jul. 14, 2022

Related U.S. Application Data

(60) Provisional application No. 62/898,741, filed on Sep. 11, 2019.

(51) Int. Cl.
*B64C 11/00* (2006.01)
*B64C 7/02* (2006.01)

(52) U.S. Cl.
CPC ............... *B64C 11/00* (2013.01); *B64C 7/02* (2013.01)

(58) Field of Classification Search
CPC . B64C 2201/162; B64C 11/001; B64C 11/00; B64C 7/02
USPC .......................................................... 416/79
See application file for complete search history.

(56) References Cited

U.S. PATENT DOCUMENTS

| | | | |
|---|---|---|---|
| 2005/0172611 A1 | 8/2005 | Blodgett et al. | |
| 2016/0040595 A1 | 2/2016 | Devine | |
| 2016/0053683 A1 | 2/2016 | Labrecque et al. | |
| 2016/0061144 A1* | 3/2016 | Filter | F01D 25/005 415/151 |
| 2016/0186690 A1 | 6/2016 | Florea et al. | |
| 2017/0159674 A1 | 6/2017 | Maciolek | |

FOREIGN PATENT DOCUMENTS

RU    2057904 C2    12/2000

OTHER PUBLICATIONS

International Search Report and Written Opinion filed in PCT/US20/50507, dated Sep. 11, 2020, 24 pgs.

* cited by examiner

*Primary Examiner* — Eldon T Brockman
(74) *Attorney, Agent, or Firm* — Vedder Price P.C.

(57) ABSTRACT

This present disclosure relates generally to propulsion systems and, more particularly, to adaptive ducted fan propulsion systems for use with aircraft such as unmanned aerial vehicles. Embodiments of ADF systems in accordance with the present disclosure feature automatic, fast operation, increase the intake section of the air mass fed to a propeller, and can increase thrust by 35%-40% as compared to existing ducted fans.

12 Claims, 22 Drawing Sheets

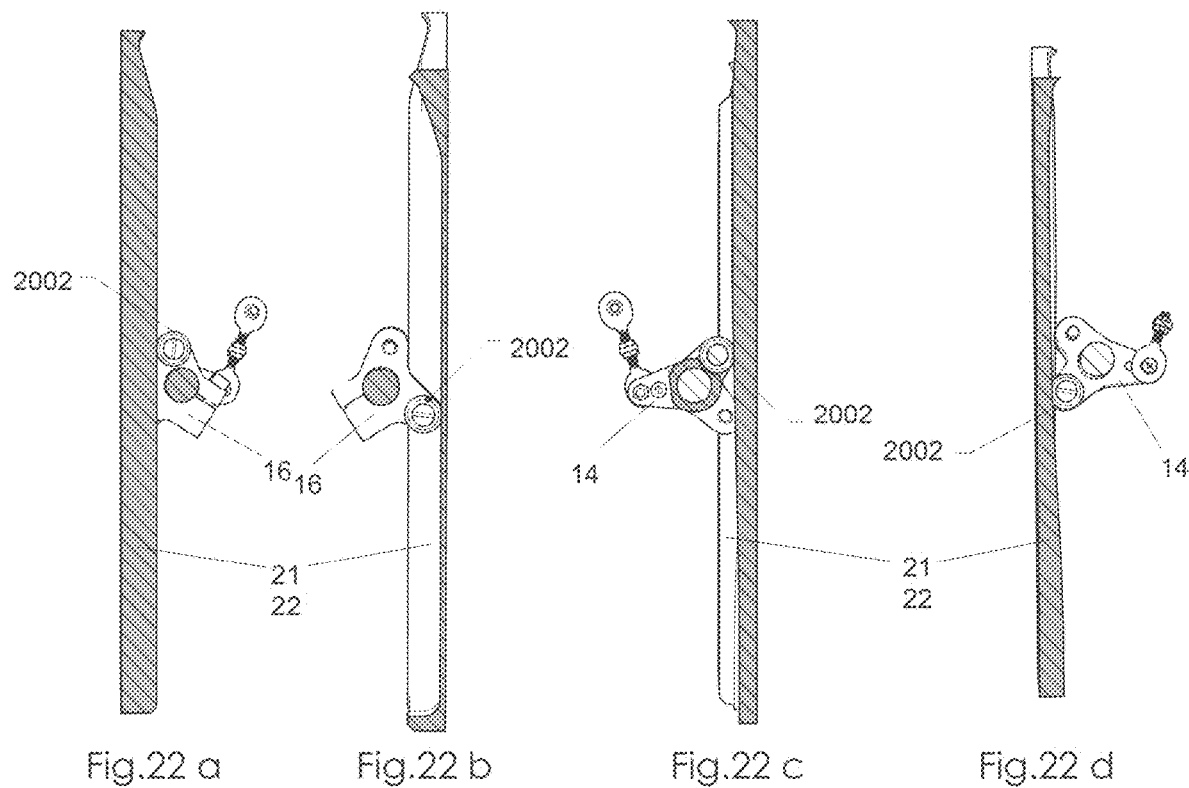

ADAPTIVE DUCTED FAN PROPULSION SYSTEM

CROSS-REFERENCE TO RELATED APPLICATIONS

This application is a National Phase application claiming priority to PCT Application No. PCT/US20/50507, filed on Sep. 11, 2020 which claims the benefit of and priority from U.S. Provisional Patent Application Ser. No. 62/898,741, filed on Sep. 11, 2019, the contents of which are hereby fully incorporated herein by reference in their entirety.

FIELD OF THE INVENTION

The present invention relates generally to propulsion systems and, more particularly, to adaptive ducted fan propulsion systems for use with aircraft such as unmanned aerial vehicles.

BACKGROUND

An advanced air mobility (AAM) including unmanned aerial systems (UAS) or urban air mobility (UAM) or regional air mobility (RAM) or unmanned aerial vehicle (UAV) or drone is an aircraft without any human pilot or passengers. UAVs may be fully autonomous or may be controlled remotely, such as with a remotely piloted aircraft system (RPAS). Existing UAMs and UAVs often take the form of a cylinder comprising an axially integrated propeller which is driven by an electric or turbo-reactive engine. UAMs and UAVs may include additional propulsion components such as an electric ducted fan (EDF), a ducted fan (DF), or a double ducted fan (DDF) comprising a double air absorbing mouth directed toward the propeller.

Such known propulsion devices suffer from a number of disadvantages.

First, these propulsion devices limit the power achieved by absorbing the mass of air directed to the propeller as the power provided by these known propulsion devices is generally directly proportional to the mass of the processed air.

Second, in order to operate these known propulsion devices under conditions of low atmospheric pressure, it is necessary to increase the frequency of the propulsion system speed to process the required amount of air, which leads to an exponential decrease in system efficiency overall (kWh of energy consumed in the report with N-thrust).

Third, due to the fixed structure (i.e., the fan duct) used in known propulsion devices, the propulsion device is incapable of adapting to variable atmospheric conditions.

Fourth, in the case of known turbo-fan devices (e.g., as is used on the Boeing 737 aircraft, which features a propulsion device with a fixed structure), the turbo-fan device works inefficiently on takeoff and during ascent to cruise altitude (Liters of kerosene per N Thrust), resulting in increased fuel consumption.

Taken together, the foregoing disadvantages are believed to result in economic losses of approximately 10%-12% (especially in terms of an airplane).

Accordingly, a need exists for an improved propulsion system for aircraft that addresses the foregoing disadvantages.

SUMMARY

Embodiments of the present application are directed devices and methods that reduce the interdependence between the maximum absorption capacity of the air masses in the system relative to the propulsion system surfaces represented by the Bernoulli equation.

Embodiments of the present application are directed towards conceptual and constructive improvements of existing propulsion devices widely employed in aviation. Embodiments provide a device representing a cylindrical pipeline whose profile is described by an adapted aerodynamic airfoil. Embodiments provide for an improved propulsion system, termed an adaptive ducted fan (ADF), that addresses disadvantages with conventional propulsion systems.

Embodiments in accordance with the present disclosure provide an ADF comprising integrated cinematic deployment mechanisms leading to the structural optimization of the inlet nozzle to enlarge the section but also the absorption capacity of the air masses directed to the propeller of the system of propulsion.

Embodiments in accordance with the present disclosure provide an ADF that amplifies and improves upon the ability of conventional propulsion systems to increase the quantity of air masses processed by the system, while increasing the surface of the low pressure area.

Embodiments in accordance with the present disclosure provide an ADF that may be applied to various aircrafts such as AAMs and drones (UAM/UAV/RPAS). Embodiments in accordance with the present disclosure provide an ADF offering automated and fast performance by exercising the growth of the input section of the air masses to the propeller, considerably increasing the thrust provided by the propulsion device (including in embodiments by approximately 35%-40%), and reducing energy consumption, all while maintaining approximately the diameter and mass of a standard ducted fan.

Embodiments in accordance with the present disclosure provide an ADF comprising an automated system incorporated into the propulsion system structure. Depending on the required mode, embodiments provide an ADF that may be employed using only some of the constituent elements disclosed herein, such as by applying the present disclosure to the hollow cavity section of the fan duct. Embodiments provide an ADF that can be mounted or integrated on any type of aviation propulsion system.

Embodiments in accordance with the present disclosure provide an ADF comprising metals, polymers, rigid, elastic, and flexible composite materials in various proportions such as the following: 60% carbon fiber; 15% aluminum T6; 10% titanium; 5% magnesium; and 10% polymers.

Embodiments in accordance with the present disclosure provide an ADF comprising a set of structural elements, which, when actuated are grouped in a predefined form, are integral by essence. A system of rails and levers ensures the optimal cinematic movement (release/retraction) for the entry of movable elements into the hollow cavity section of the fan duct. The movement is ensured by motor/electric motors or hydraulic or pneumatic systems. The steering of the pivot process is ensured by an electronic computing and/or control device, through electrical cables, optical fiber, or wireless technology.

Embodiments in accordance with the present disclosure provide an ADF comprising aerodynamic structural elements 5 equipped with brackets, rail system 6, motor/engine assembly 7, transmission 8, and an arbitrary fan 9.

Embodiments of an ADF in accordance with the present disclosure can be mounted on any type of ducted fan, including those widely used in the urban air mobility and regional air mobility or drone industry (such as UAV/

RPAS), regardless of the type of propulsion of the fan or fans or propeller or propellers. Embodiments of an ADF in accordance with the present disclosure comprise metals, polymers, rigid, elastic, and flexible composite materials in various proportions.

BRIEF DESCRIPTION OF THE DRAWINGS

Additional aspects of the disclosure will be apparent to those of ordinary skill in the art in view of the detailed description of various embodiments, which is made with reference to the drawings, a brief description of which is provided below.

FIGS. 22a and 22b are sectional views of the ADF propulsion system of FIG. 1 taken through the kinematic elements 21, 22 shown in FIG. 20.

FIGS. 22c and 22d are sectional views of the ADF propulsion system of FIG. 1 taken through the kinematic elements 21, 22 shown in FIG. 21.

Figure 1:
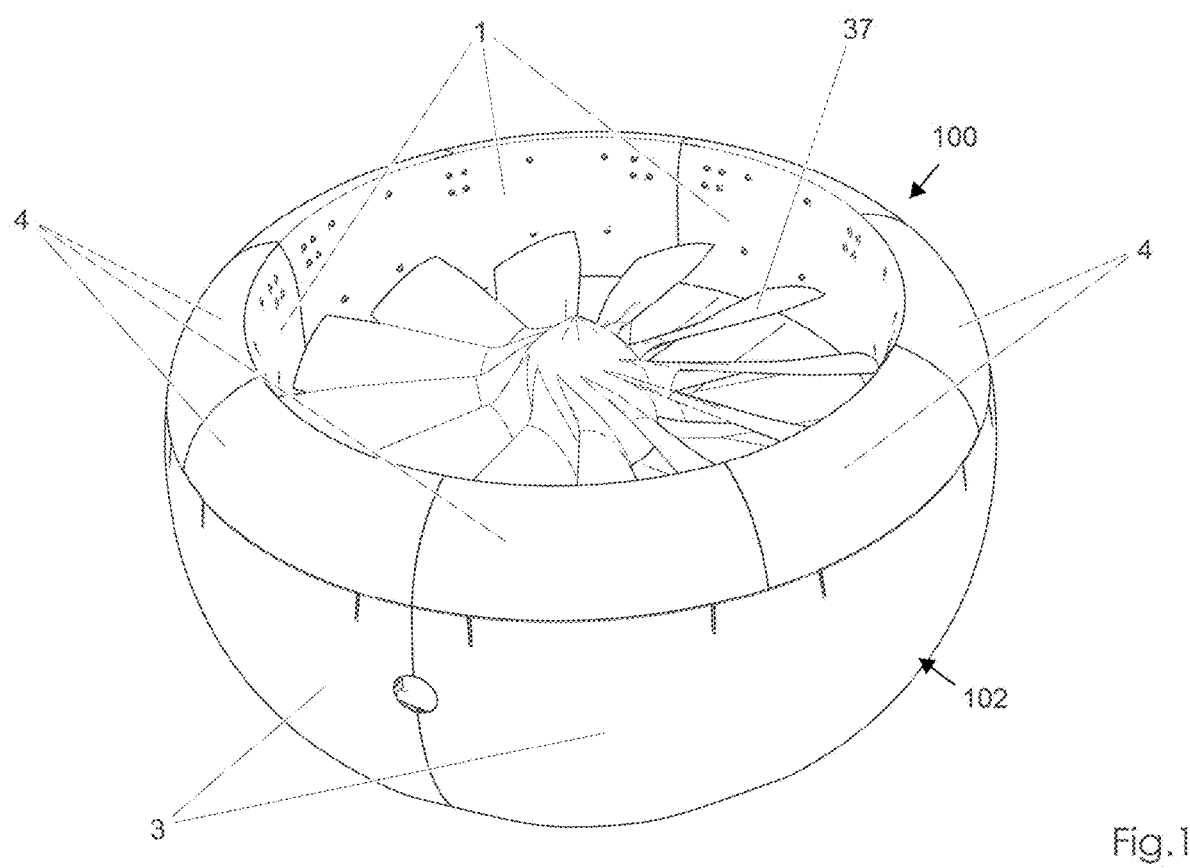
FIG. 1 is a top closed perspective view of the ADF propulsion system in accordance with one embodiment.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 2:
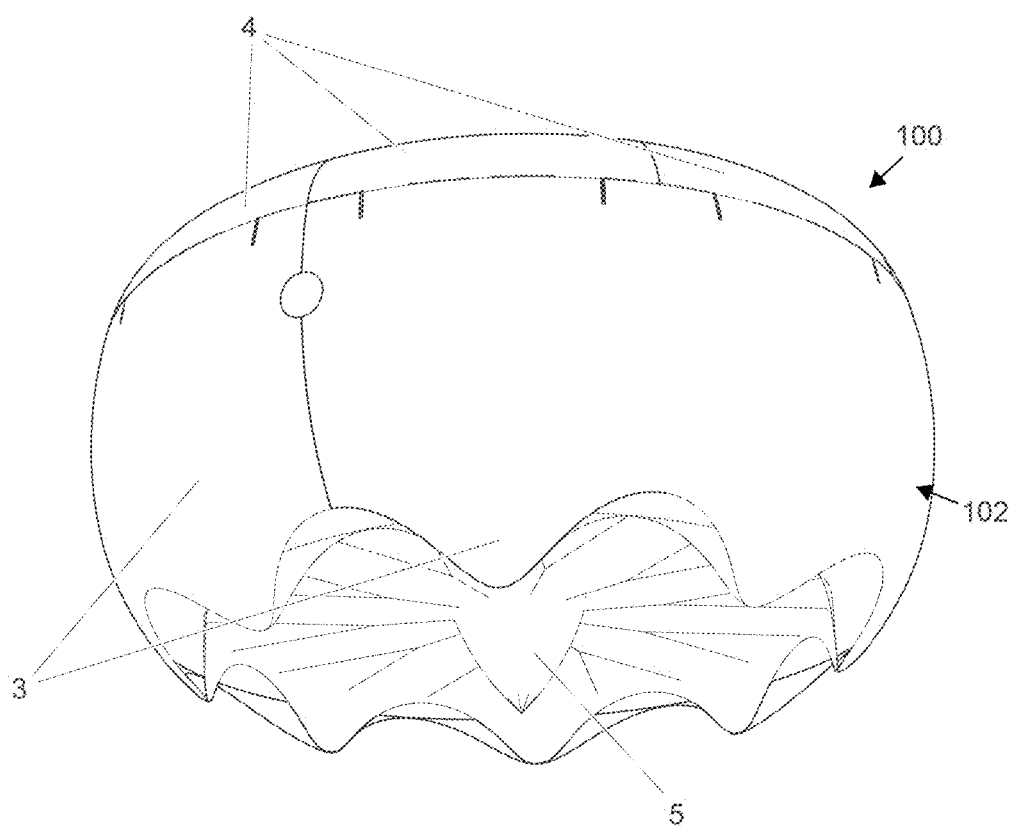
FIG. 2 is a bottom closed perspective view of the ADF propulsion system of FIG. 1.

Referring specifically to FIGS. 1 and 2, an adaptive ducted fan (ADF) propulsion system 100 (also referred to herein as an ADF or an ADF device) comprises an aerodynamic cave tube 102 (also referred as a nacelle) having a plurality of inner panels 1, a plurality of caps 4, a plurality of chevron panels 3 cooperative forming a chevron cover, and streamlining 5. A propeller 37 rotates within the tube 102 proximate the inner panels 1, causing air to flow through the tube 102.

The ADF 100 features multiple phases. In FIGS. 1 and 2, the ADF 200 is depicted in a closed phase, wherein the caps 4 are proximate the chevron panels 3 (i.e., such that the tube 102 forms a hollow cylinder with the propeller 37 located in the center of the cylinder).

Figure 3:
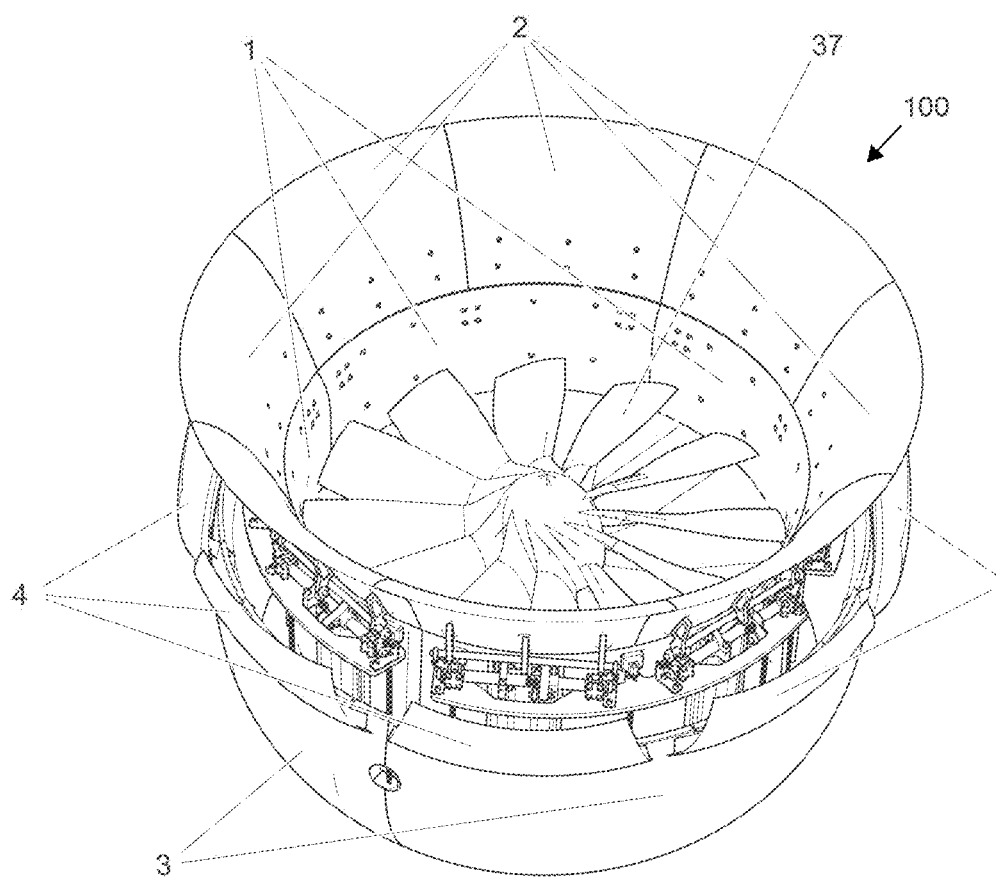
FIG. 3 is a top opened perspective view of the ADF propulsion system of FIG. 1.
Figure 4:
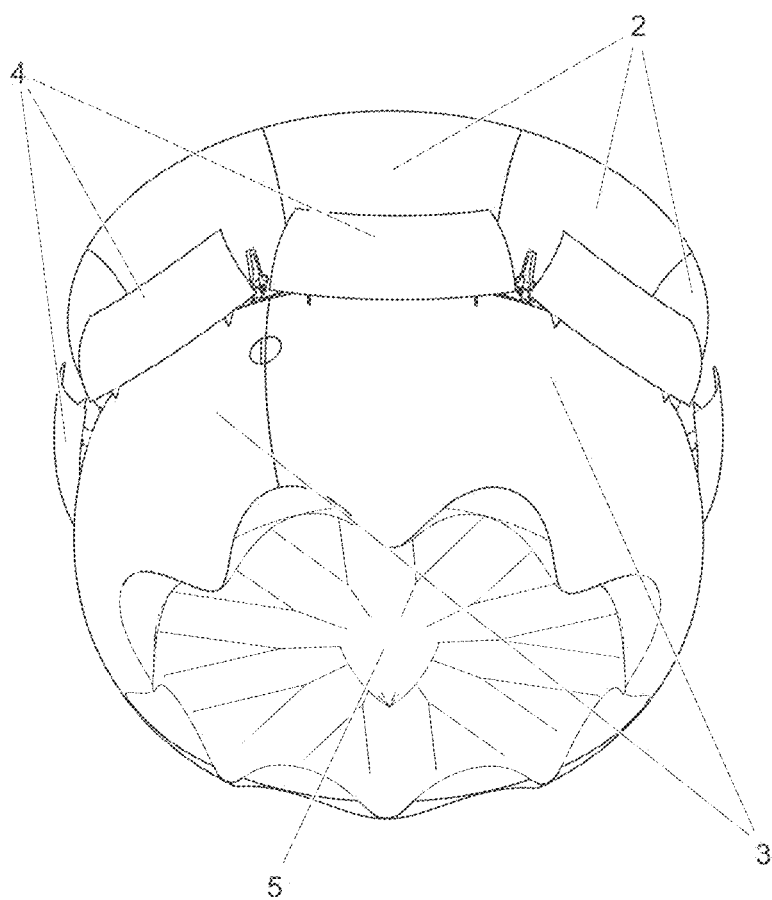
FIG. 4 is a bottom opened perspective view of the ADF propulsion system of FIG. 1.

As depicted in FIGS. 3 and 4, the ADF propulsion system also has an open phase. As shown, the caps 4 are independently actuated and fold apart from the chevron panels 3 in the open phase, permitting a plurality of paddles 2 which are independently actuated to extend from the interior of the tube 102 (thereby changing the profile of the ADF 100).

Figure 5:
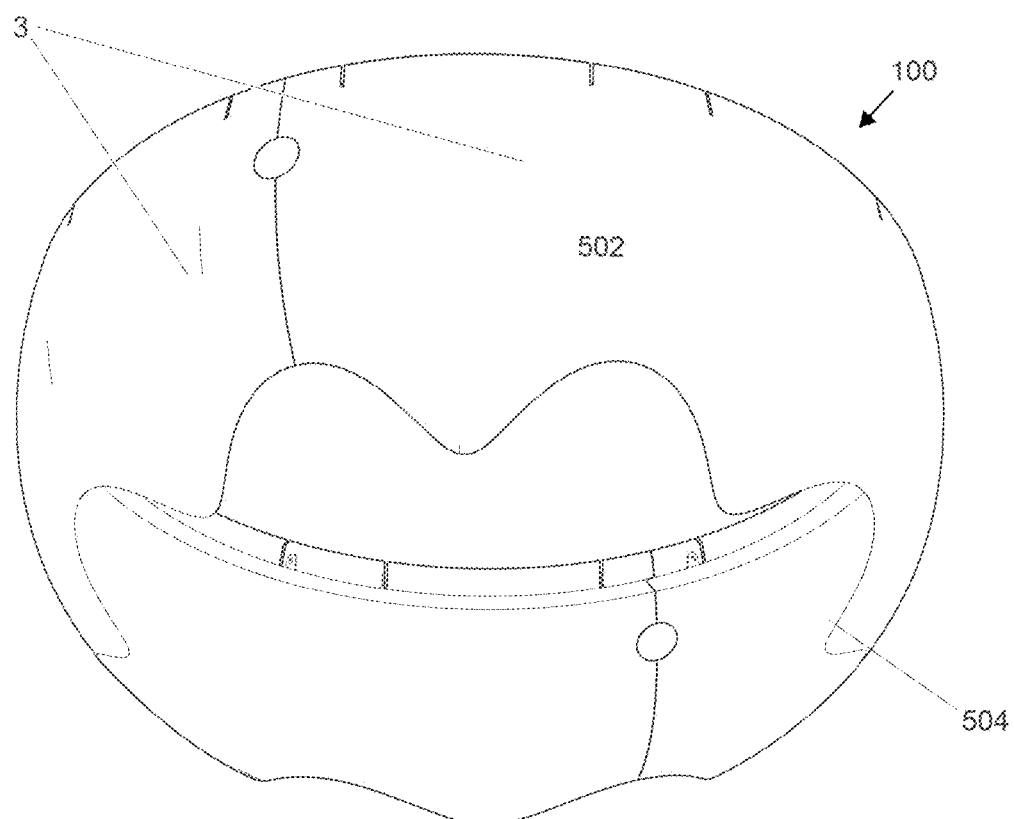
FIG. 5 is a bottom perspective view of the chevron body of the ADF propulsion system of FIG. 1.

As shown in FIG. 5, in an embodiment the tube 102 comprises two symmetrical chevron panels 3 having a rounded profile. This shape and configuration of chevron panels 3 ensures an optimal mixture of the air streams generated by propeller 37 and the air flow obtained from the atmosphere due to the Venturi effect when the ADF 100 is in the closed configuration. As a result, this configuration of chevron panels 3 in the closed configuration minimalizes air disturbances and the noise emitted by the ADF device 100. In alternative embodiments, other configurations of chevron panels 3 may be utilized, as will be clear to one of skill in the relevant art, such as forming the chevron cover from a single chevron panel 3 or more than two chevron panels 3.

Figure 6:
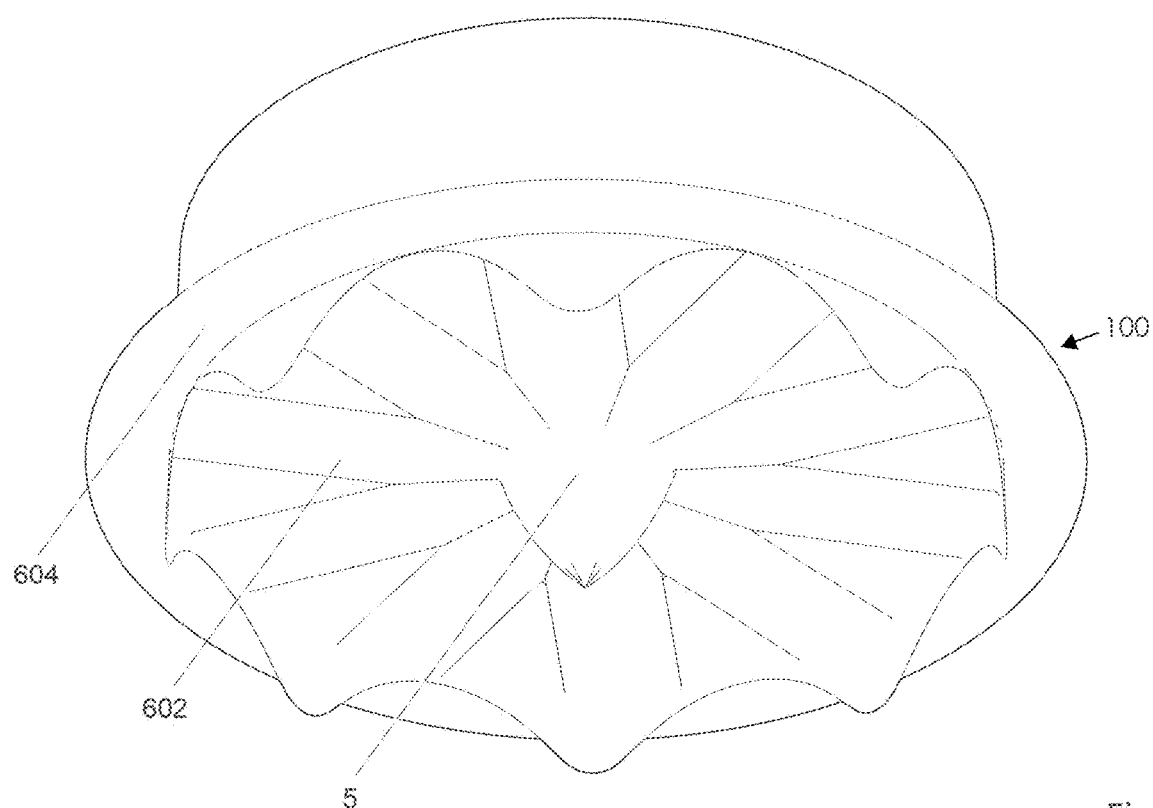
FIG. 6 is a bottom view of the streamlining of the ADF propulsion system of FIG. 1.

FIG. 6 depicts the streamlining 5 of the ADF device 100 with the other elements of the ADF 100 omitted for clarity. As shown, the streamlining comprises a plurality of blades 602 rotatably held within a housing 604. The configuration of streamlining 5 forces air flowing through the tube 102 due to rotation of the propeller 37 to move in a spiral. The blades 402 have a radial arrangement and an involute aerodynamic profile along their inner surface, which directs the air flow along the rotor axis of the propeller 37 (thereby increasing the processed air pressure through the ADF 100).

Figure 7:
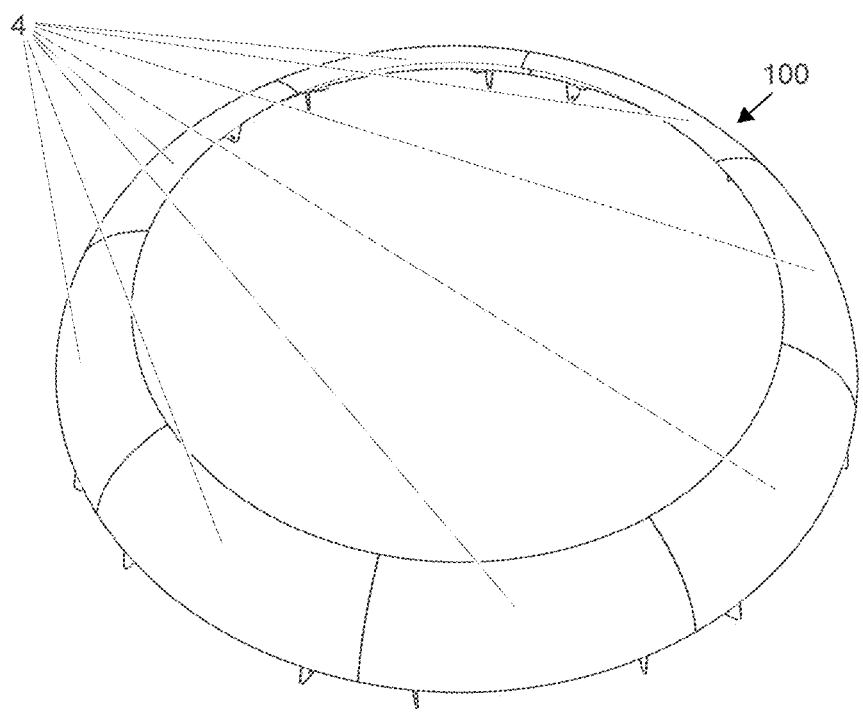
FIG. 7 is a top closed perspective view of the nacelle cap of the ADF propulsion system of FIG. 1.
Figure 8:
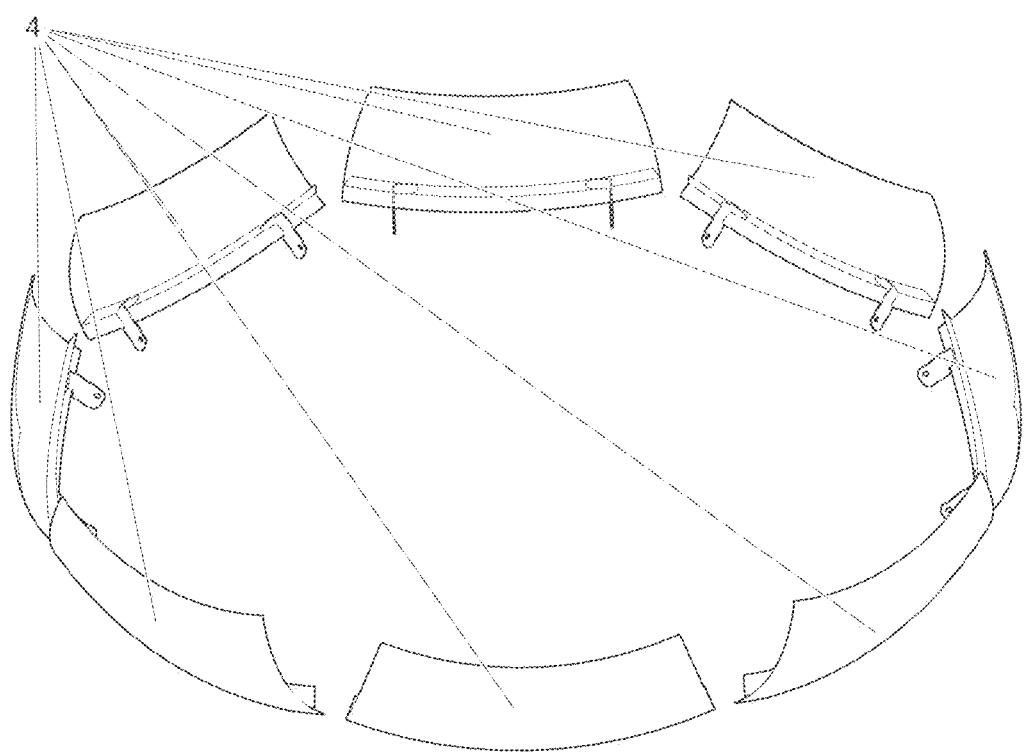
FIG. 8 is a top opened perspective view of the nacelle cap of the ADF propulsion system of FIG. 1.

FIGS. 7 and 8 depict the caps 4 of the ADF 100 with the other elements of the ADF 100 omitted for clarity. The caps 4 function to ensure the aerodynamic integrity of the nacelle 102 while in a closed phase, as depicted in FIG. 7. In the closed phase, the caps 4 cover the interior of the tube 102 and provide a smooth surface for air to travel along.

In the opened phase depicted in FIG. 8, the caps 4 are actuated apart such that the caps 4 are separate from one another and the chevron panels 3, providing access to the interior of the tube 100 and allowing the paddles 2 to extend proximate the inner panels 1.

Figure 9:
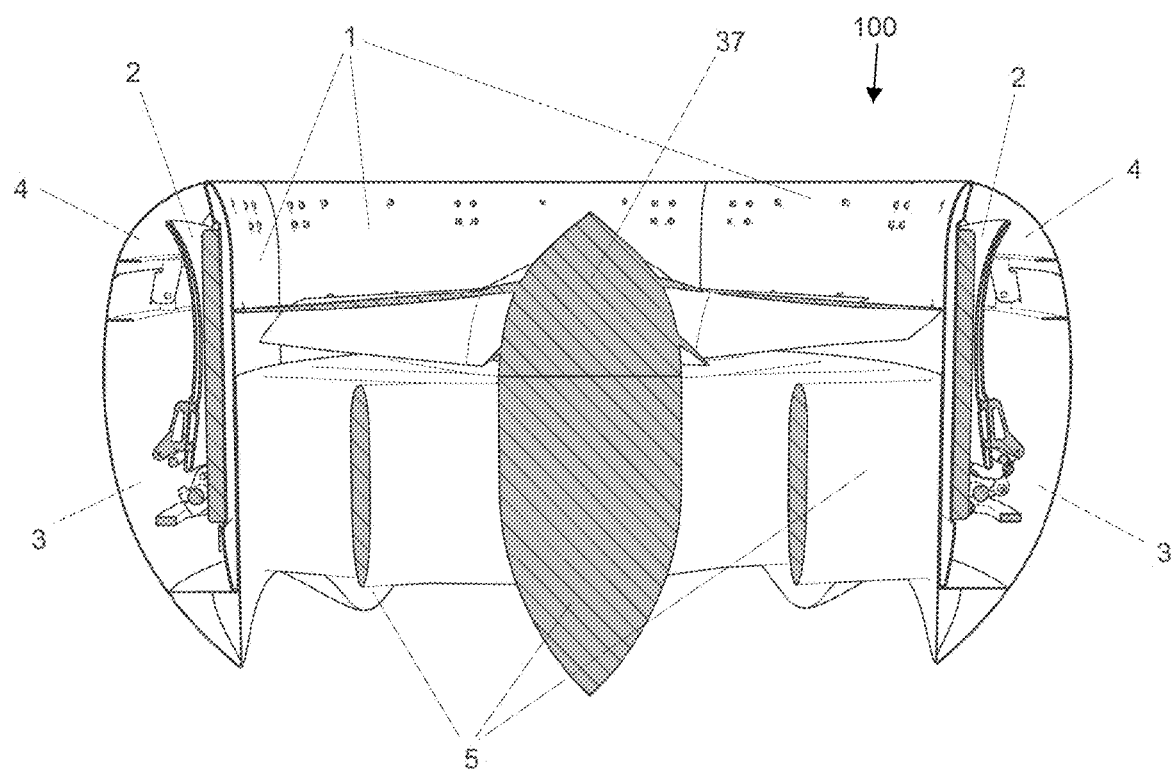
FIG. 9 is a cross-section illustration of the closed paddles inside of the nacelle of the ADF propulsion system of FIG. 1.

FIG. 9 depicts a cross-sectional view of the ADF device 100 shown in FIG. 1 in its closed phase, which allows for viewing the arrangement of the component parts. As shown, in the closed phase paddles 2 are folded into the hollow walls of the tube 102 and are fully covered by caps 4, chevron 3, and inner panels 1.

Figure 10:
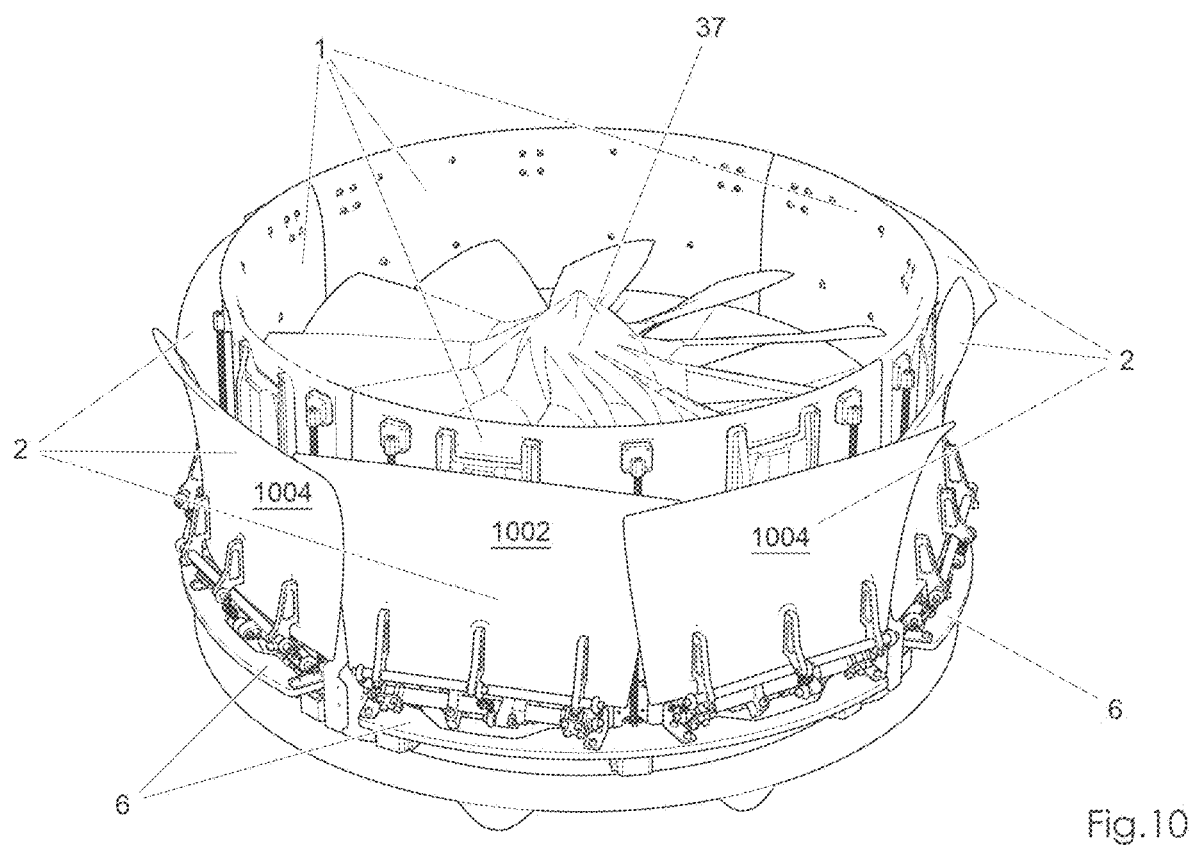
FIG. 10 is a top perspective view of the internal tube of the nacelle of the ADF propulsion system of FIG. 1 with closed paddles.

FIG. 10 depicts the ADF 100 of FIG. 1 with the chevron panels 3 and caps 4 omitted, so as to better illustrate the compact arrangement of the paddles 2 and the support plates 6 around the inner panels 1 of the tube 102 in the closed phase. As shown, each paddle 2 is rotatably mounted to a support plate 6. Each support plate 6 is slidably mounted to the interior side of an inner panel 1.

In the embodiment shown, there are an even number (i.e, eight) of paddles 2 and in the closed phase, the panels 2 are arranged equidistant from, and overlapping, one another. In alternative embodiments, other configurations of paddles 2 may be used as will be clear to one of skill in the art from the present disclosure.

Figure 11:
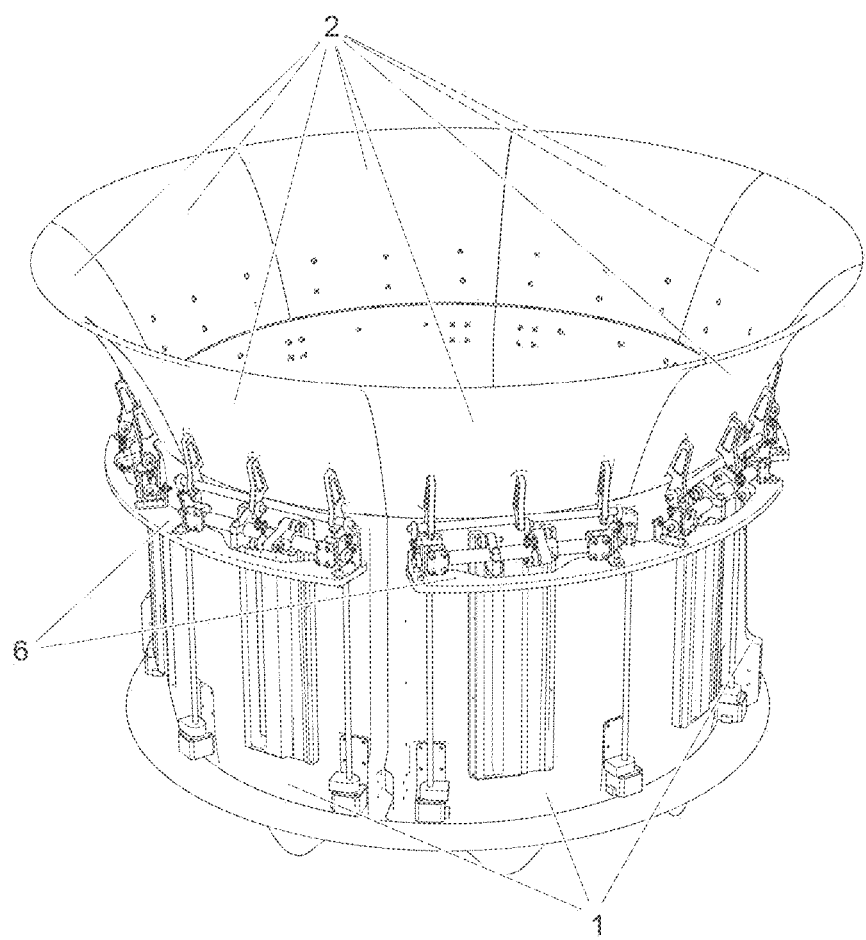
FIG. 11 is a top perspective view of the internal tube of the nacelle of the ADF propulsion system of FIG. 1 with opened paddles.

FIG. 11 depicts the ADF 100 of FIG. 1 with the chevron panels 3 and caps 4 omitted, so as to better illustrate the compact arrangement of the paddles 2 in the open phase. As shown, the paddles 2 move proximate the top edges of the inner panels 1 while in the open phase, thereby forming an inlet diffuser which increases the air section/air area about the mouth of the tube 102 by about 2.3 times and/or Ø 53% relative to the section passage of air into the propeller area 37 in the closed phase. As shown, the panels 2 abut one another and have substantially no space in between one another in the open phase. The panels 2 are curved away from the central axis of the tube, such that the radius of the opening of the tube 102 at the front end of the panels 2 is larger than the radius of the tube 102 at the bottom end of the panels 2.

Figure 12:
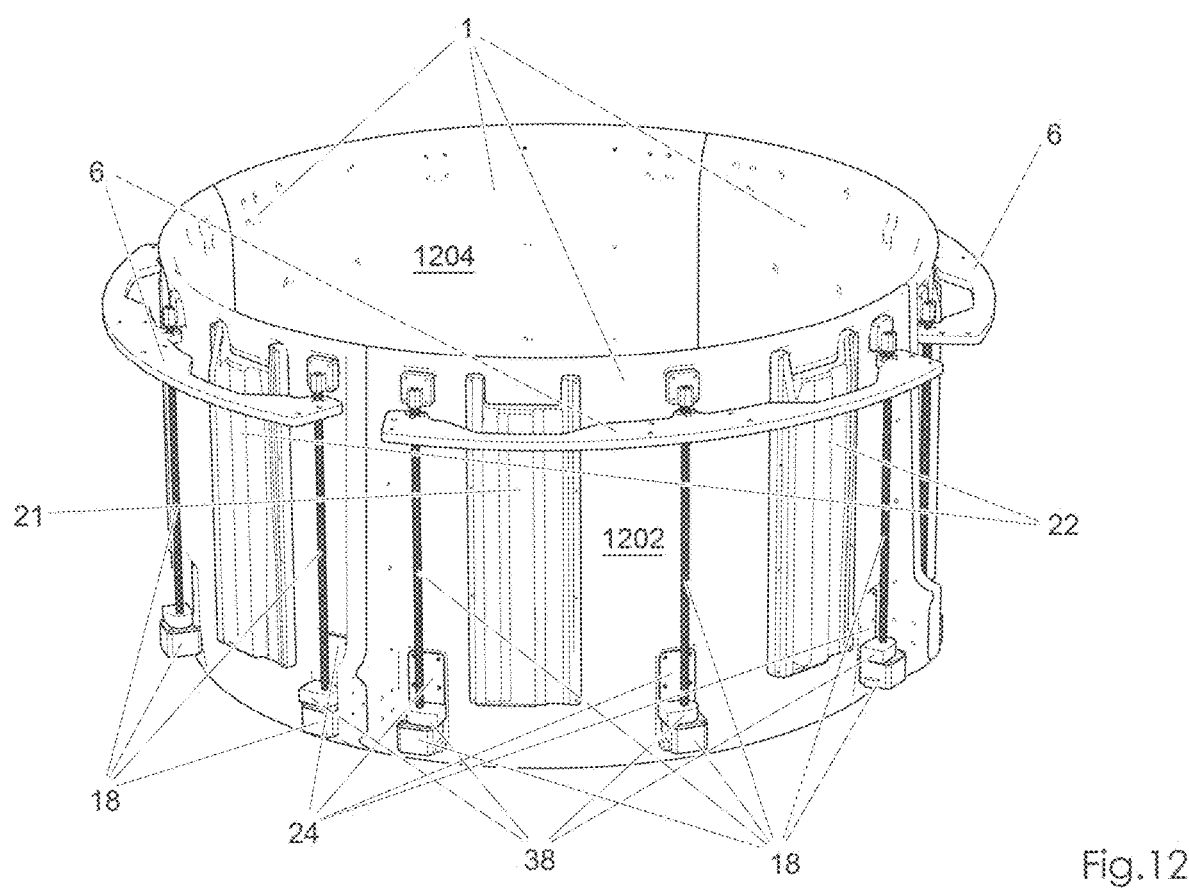
FIG. 12 is a perspective side view of the internal tube of the ADF propulsion system of FIG. 1 with the linear motion and cinematics parts.

FIG. 12 depicts the ADF 100 of FIG. 1 with the chevron panels 3, caps 4, and panels 2 omitted to better depict the structure of the outer wall of the inner panels 1. The inner panels 1 collectively form the inner wall of the tube 102 and serve as mounting/positioning base supports for the other components of the ADF device 100. As shown, each supporting plate 6 moves along three servo-linear directions 18 (also termed an actuator), each of which is threaded. Each supporting plate 6 is configured to hold two adjacent panels 2 (not show). For each panel 102, a kinematic guiding plate 21, 22 is located against the outer surface 1202 of inner panel 1. The servo-linear directions 18 are equipped with position sensors (encoders) 38 and are held to the outer surface 1202 of the inner panels 1 by gripping elements 24. Supporting plates 6 are mounted with three-point fastening through the threads of the servo-linear directions 18. By rotating the servo-linear directions 18, the supporting plates 6 may be raised or lowered.

Figure 13:
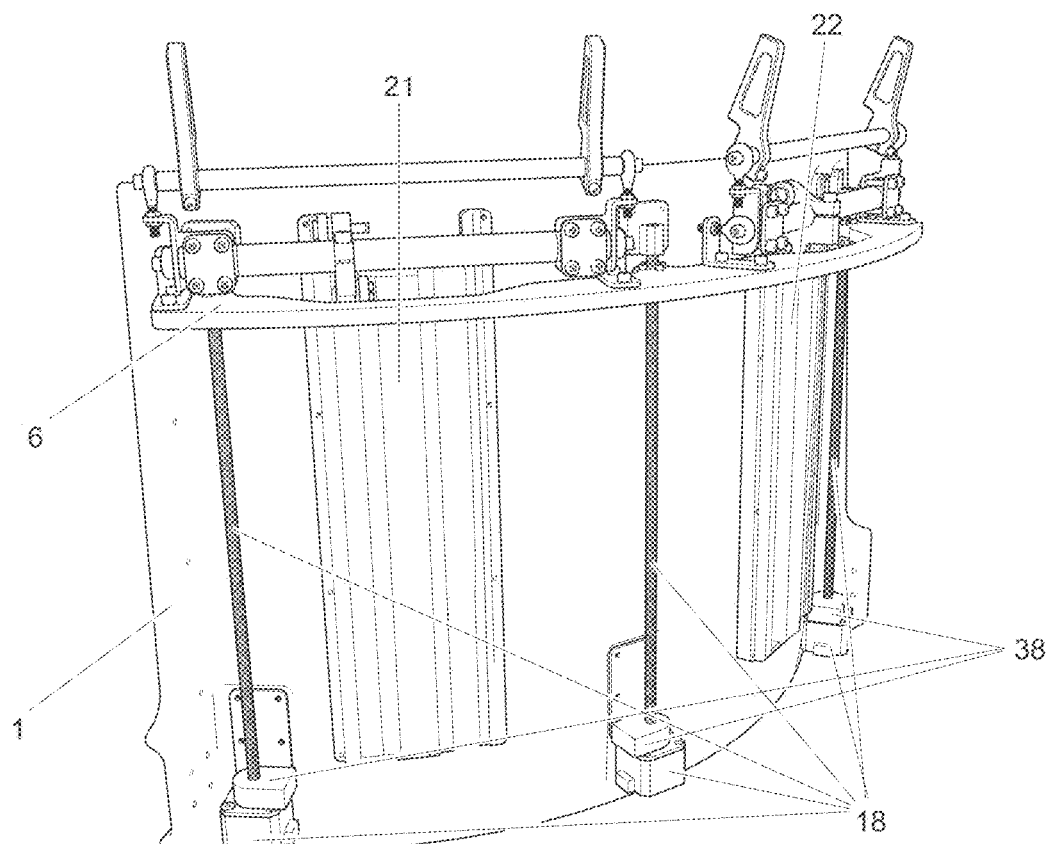
FIG. 13 is a ¼ section of the internal tube of the ADF propulsion system of FIG. 1 with a 1st round of cinematic parts.

FIG. 13 depicts one fourth (i.e., the connection points and associated mechanisms for two of the eight panels 2) of the ADF 100 of FIG. 1 with the chevron panels 3, caps 4, and panels 2 omitted to better depict the structure of the outer wall of the inner panels 1.

Figure 14:
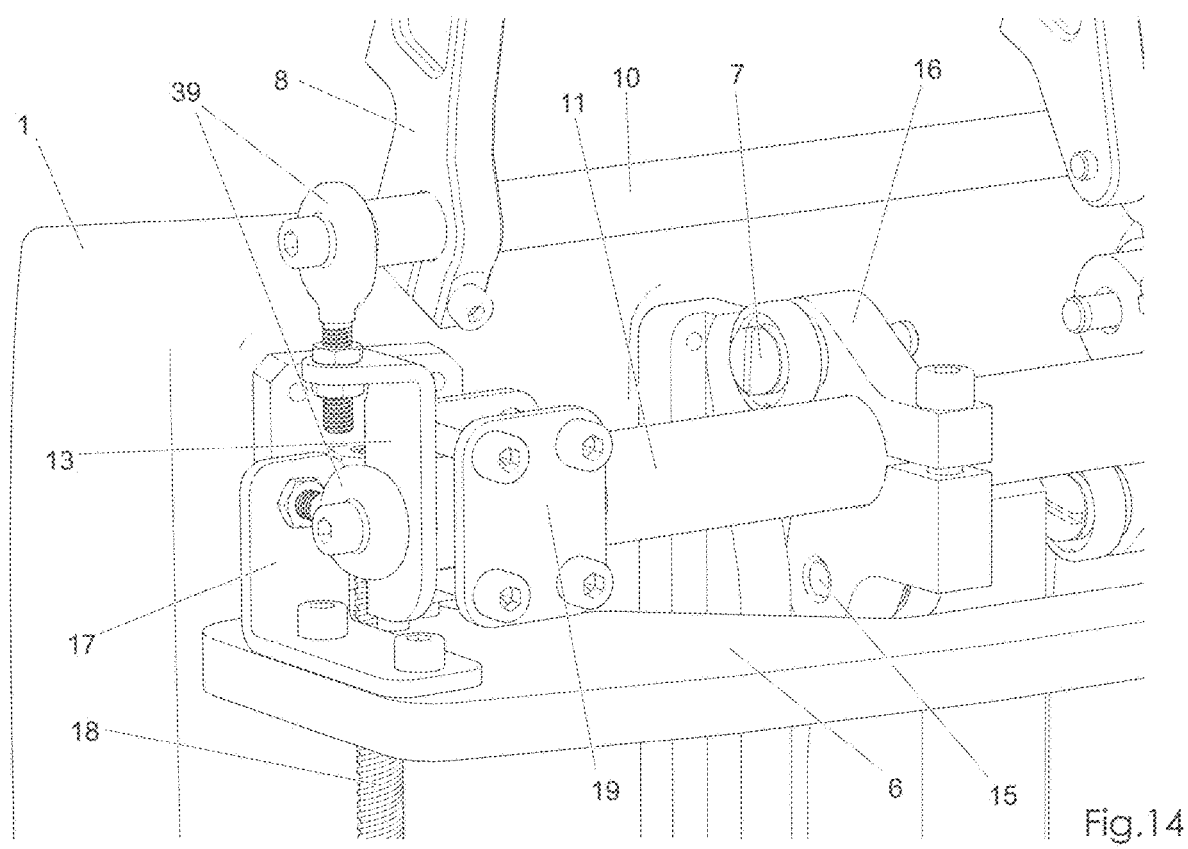
FIG. 14 is a ¼ section of the internal tube of the ADF propulsion system of FIG. 1 with a 2nd round of cinematic parts.

FIG. 14 depicts an enlarged view of FIG. 13 showing the components joining the panels 2 to the supporting plates 6.

As shown, a support plate 6 is connected to an angle bracket 17. The support plate 6 and angle bracket 17 may be joined by screws, bolts, or other suitable connectors. A joint 39 is connected to the vertical protrusion of angle bracket 17. The joint 39 may be screwed into an opening on the angle bracket 17 as shown or connected via another suitable mechanism. The joint 39 is screwed to components 10, 11, and 13 to form a resistance frame. The component 11 is secured by rotation through the plate 19 screwed onto the component 13. On the component 11 is rigidly mounted the type A lever 16, on which extremities a bearing is attached by special screws 7, 15. The component 13 engages the hinge 39, the hinge 10 is secured to the hinge 39 which engages another articulation 39, forming the second frame of resistance. In this frame of resistance, on the rod 10 there are rigidly fixed two type A brackets 8.

Figure 15:
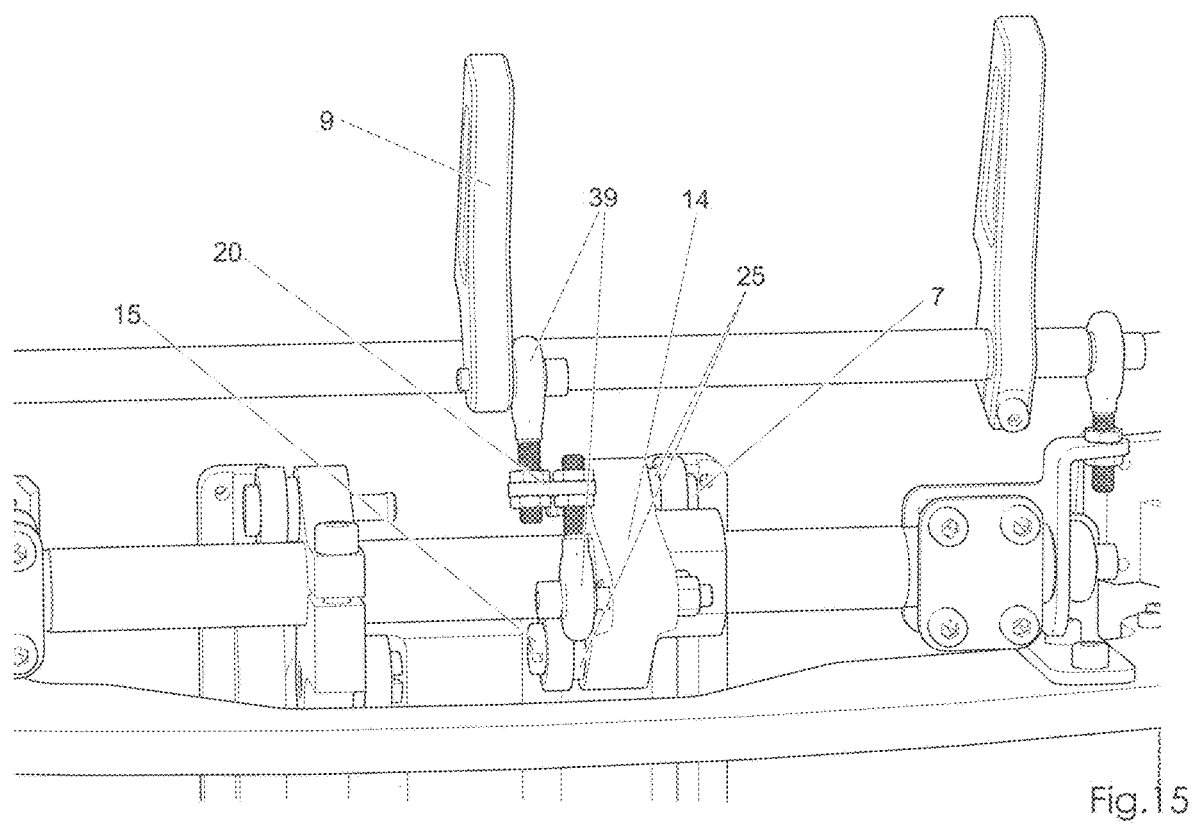
FIG. 15 is a ¼ section of the internal tube of the ADF propulsion system of FIG. 1 with paddles and cinematic parts.

FIG. 15 depicts another enlarged view of FIG. 13. As shown, lever 14 is mounted to, rod 11. Bearings 25 are clamped to the lever 14 by means of specialized screws 7, 15. The lever 14 is further operatively connected to support 9 by means of a pair of articulations 39 that are operatively connected by threaded plate 20.

Figure 16:
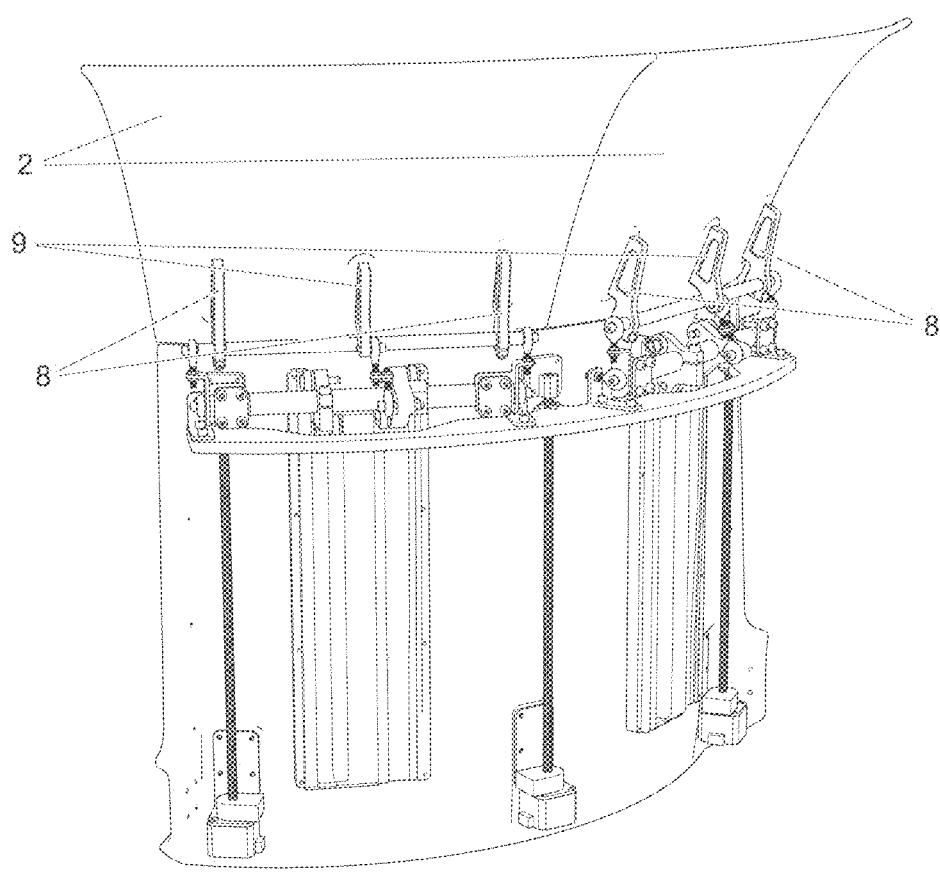
FIG. 16 is a ¼ section view of the internal tube of the ADF propulsion system of FIG. 1 with the paddles attached to supports.

FIG. 16 depicts the one quarter view of FIG. 13 with the paddles 2 attached to supports 9. As shown, thee supports 9 comprise type A fasteners 8.

Figure 17:
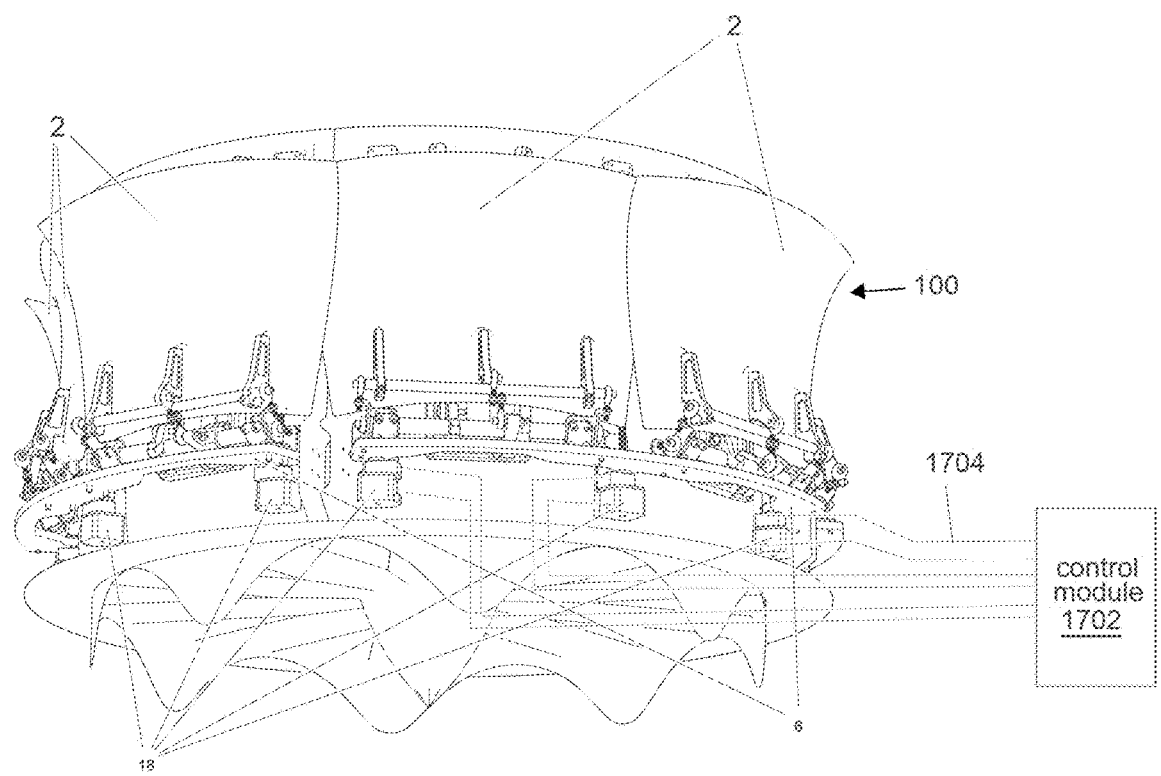
FIG. 17 is an enlarged view of the ADF propulsion system of FIG. 1 showing a movable hood assembly of the hood areas of ADF and a control module.

With reference to FIG. 17 (which depicts the ADF 100 with the chevron panels 3 omitted to better illustrate the interior of the ADF 100), in an embodiment the ADF 100 provides a propulsion system that is adaptable during use. In an embodiment shown, the ADF 100 comprises a control module 1702 configured to change the phase of the ADF (i.e., from the open phase to the closed phase, and vice versa). The control module 1702 determines when a change in phase is desirable. Such determination may be done automatically or using input from a pilot of the aircraft to which the ADF device 100 is mounted. The control module 1702 is linked by connections 1704 to the servo-linear directors 18 and the encoders 39. The connections 1704 may be wired, wireless, or any other form of connection that permits the exchange of information and commands.

To change phase, the control module 1702 issues a command to the servo-linear directors 18 (whose position is controlled by the encoders 39) to rotate. As a result, the support plate 6 moves along with the associated mounted components 2, 7, 8, 9, 10, 11, 13, 14, 15, 16, 17, 19, 20, 25, 39, at the same time opening the caps 4. In addition to the open and closed phases shown in FIGS. 1 and 3, respectively, the ADF device 100 may move to a partially opened phase such as that shown in FIG. 18, which depicts the kinematic of two different groups by positioning the paddles 2. As will be clear to one of skill in the art, any number of partially opened phases may be used to provide fine-tuned control over the ADF 100.

Figure 18:
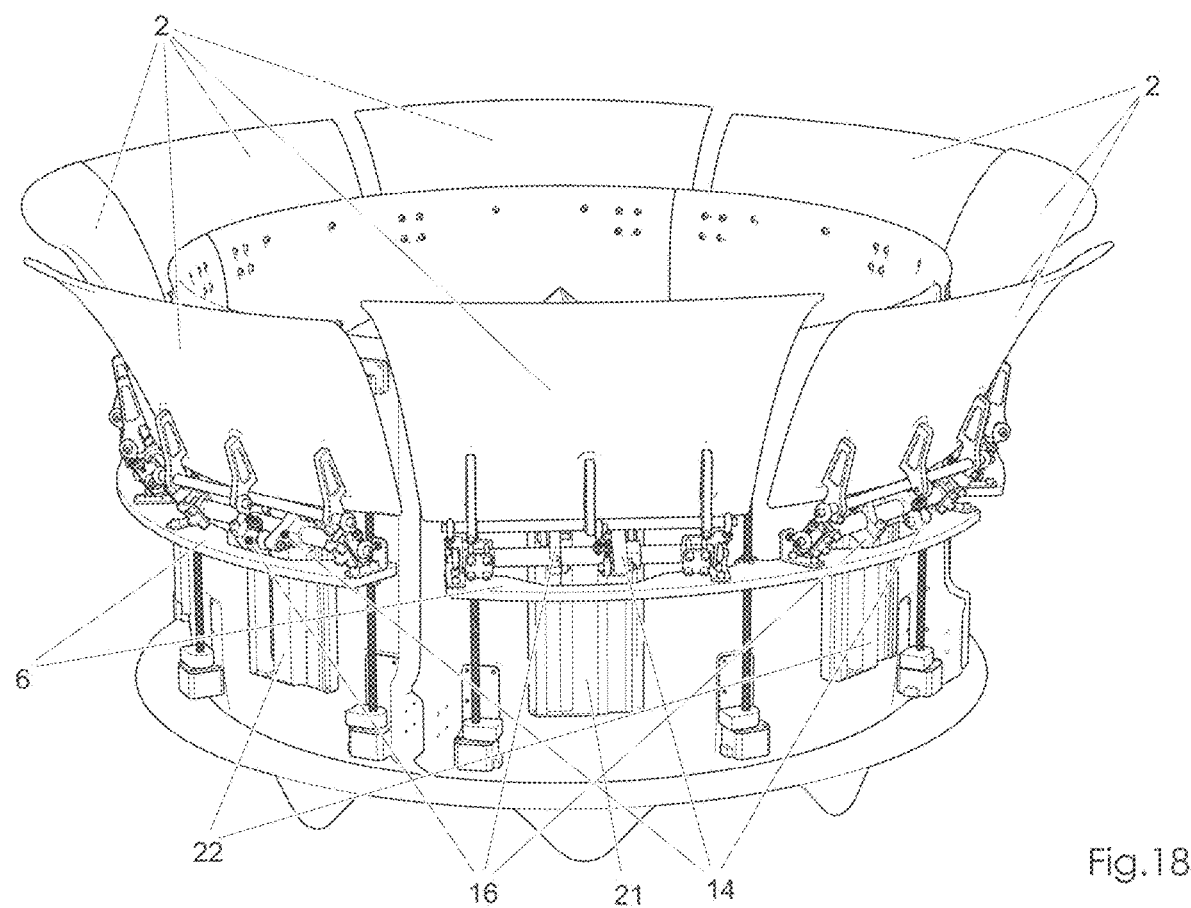
FIG. 18 is a perspective view of the ADF propulsion system of FIG. 1 showing the paddles 2 in a partially opened configuration.
Figure 19:
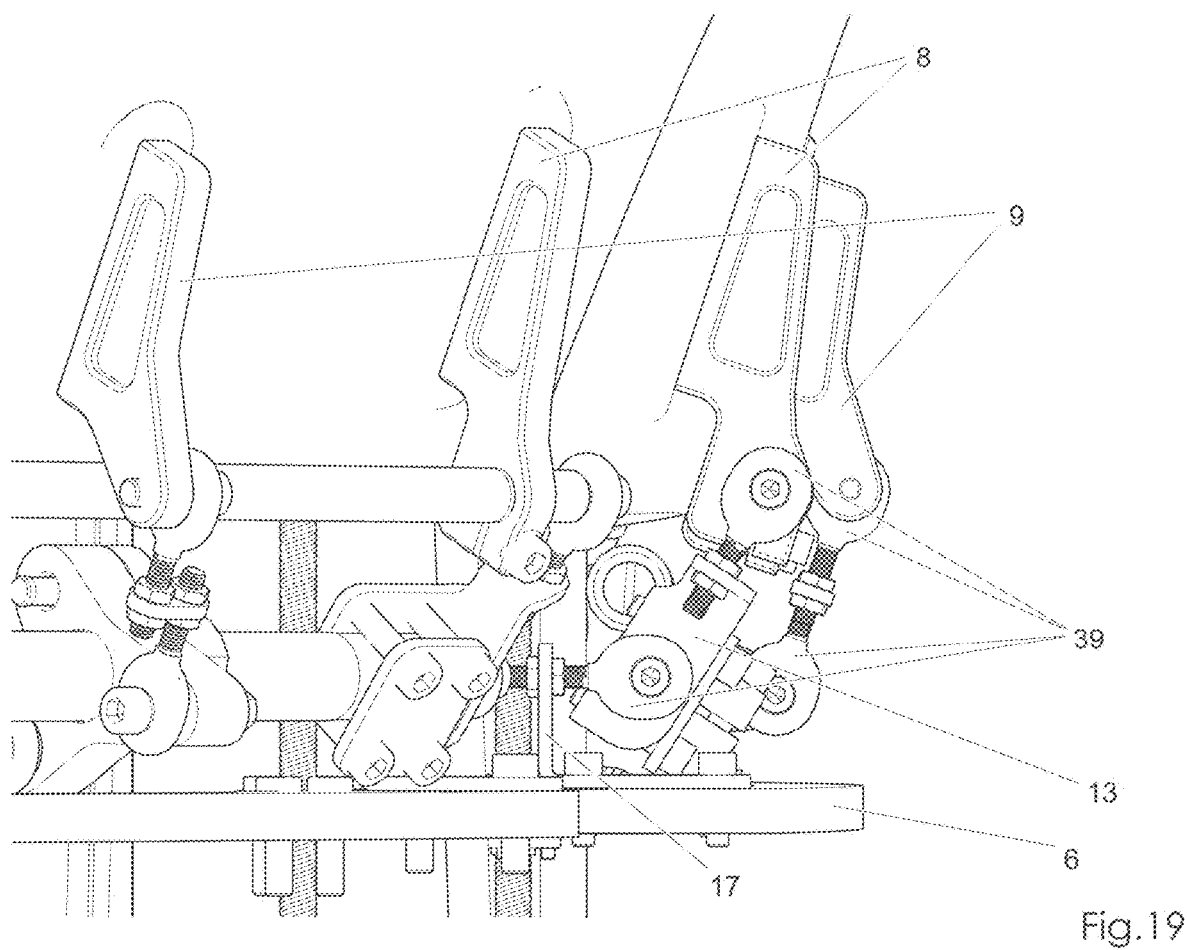
FIG. 19 is an enlarged view of the ADF propulsion system of FIG. 1 showing intermediate transmission elements between the support plate 6 and the paddles 2.

FIG. 19 depicts an enlarged view of the intermediate transmission elements between the support plate 6 and the paddles 2 according to FIG. 18.

Figure 20:
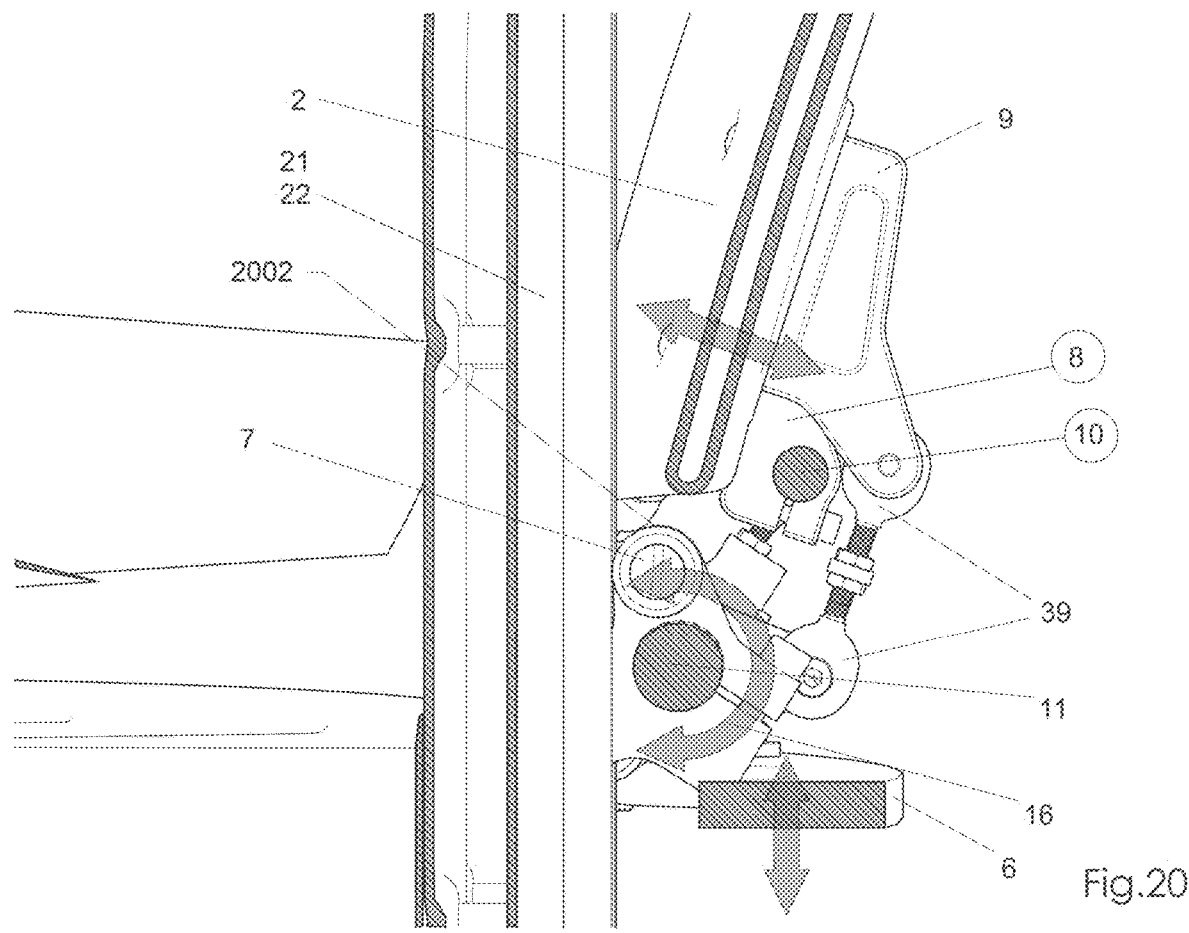
FIG. 20 is a sectional view of the ADF propulsion system of FIG. 19 depicting the directions of movement of the paddles 2 relative to the internal tube 1 indicated by arrows.

FIG. 20 depicts a sectional view of the mechanisms of FIG. 19 with the directions of movement of the paddles 2 towards the internal tube 1 indicated by arrows. As shown, radial ball bearings 2002 rotate and permit movement of the support plate 6 along the inner panel 1.

Figure 21:
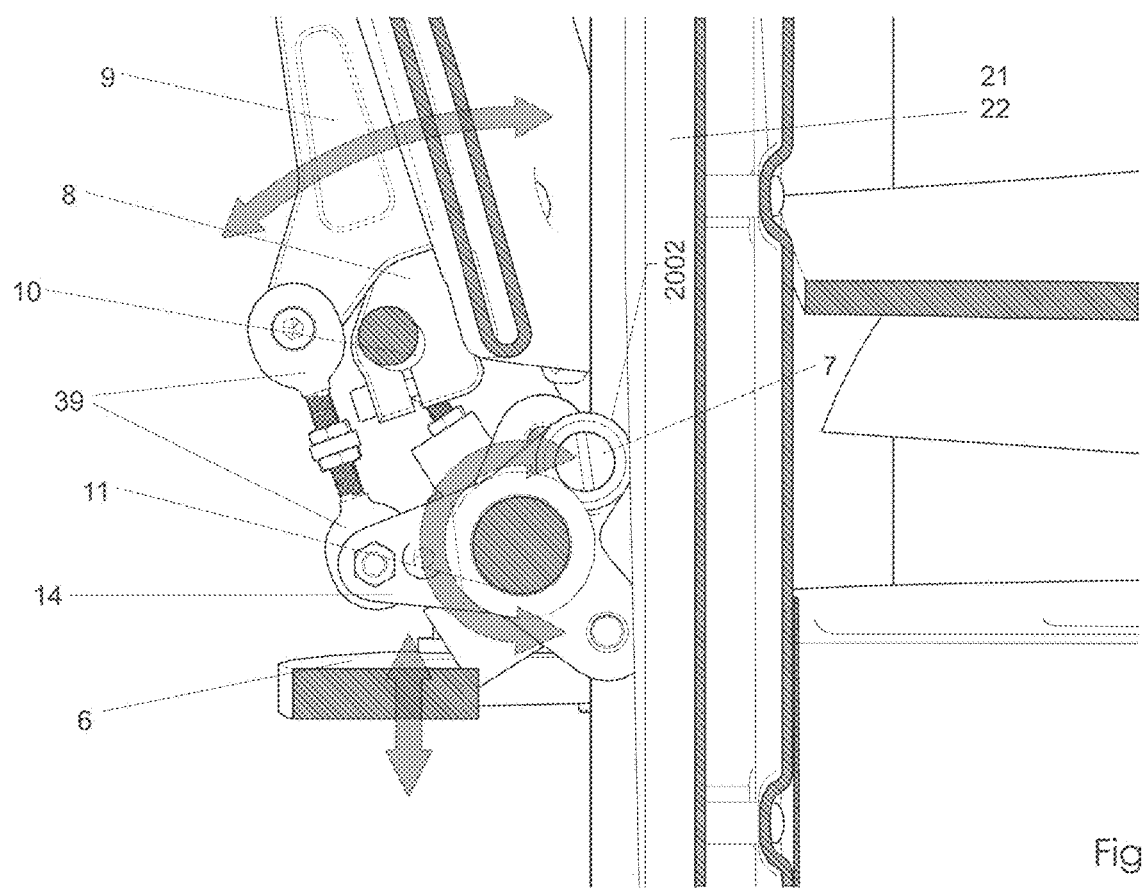
FIG. 21 is a sectional view of the ADF propulsion system of FIG. 19 taken on the opposite side from that of FIG. 20 depicting the directions of movement, as indicated by the arrows, of fulfilling the positive/negative tilt of the paddles 2 against the internal tube 1.

Similarly, FIG. 21 depicts a sectional view of the mechanisms of FIG. 19 with the directions indicated by the arrows fulfilling the positive/negative tilt of the paddles 2 against the internal tube 1. Arrows depict the movement of the panels 2, support plate 6, and rotation about component 11.

FIGS. 22a and 22b depict sectional views of the kinematic elements 21, 22 shown in FIG. 20 demonstrating the kinematic guidance process. Following the radial bearing interaction with the route for the bearing, the lever 16 moves, which is limited and articulated by the components entering it in the interaction with. The route for the bearing has a special profile and is endowed with extrusions with geometric latches designed to stop the radial bearings as described in this alignment.

FIGS. 22c and 22d depict sectional views of the kinematic elements 21, 22 shown in FIG. 21 demonstrating the kinematic guidance process following the bearing interaction with the route for bearing, by moving the lever 14, which is limited and articulated by the components entering it in the interaction. Route for bearing has a special profile and is endowed with extrusions with geometric latches designed to stop the radial bearings described in this alignment.

The movement of the pedals 2 is completed by aligning them with the top of the internal tube inlet diffuser 1, forming the adaptive diffuser of the ADF device 100 shown in FIGS. 3, 4, 11, 16.

To return to the closed phase, the previously described movements are repeated in reversed order, beginning with the command issued by the module control 1702 and finishing with the caps 4 closing.

As will be clear from the foregoing disclosure, in an embodiment, the ADF propulsion system comprises a cavity tube 102 that serves a resistance and support structure for all components of the ADF 100. The tube 102 is a revolving surface of an aerodynamic profile on the inside 1204, and outside 502 is an extruded surface representing several planar surfaces where the ADF component details are mounted. The tube design is scalable and modular, permitting ready adaptation to height and diametric adjustments. It is important that the outer tube/mounting surface 502 is individual and can be made as an independent module that can be scaled and easily adapted to any known ducted fans. The tube 102 is made of lightweight composites, polymers, and metals.

In order to ensure aerodynamic integrity, there is provided a chevron cover formed from chevron panels 3 that covers the internal structure of the ADF device 100 and also serves to minimize the aerodynamic drag. The "jagged" design of the lower edges 504 of the chevron panels 3 is an individual sinusoid with an even number (as shown, eight) elongated sinusoidal shapes that provide an optimal blend of airflow while maintaining a minimal of 60 dB noise at sub-sonic speeds. It is to be mentioned that the structure, shape, and arrangement of this "jagged" design of lower edges 504 make it possible for the noise emitted by the entire ADF 100 to be emitted with a delay of about one second. The cover chevron 3 is made of lightweight composites and malleable deformable alloys.

In order for the ADF system 100 to be adaptable, it includes movable caps 4 of a convex shape, which upon closure ensure aerodynamic integrity and, when opened, ensure that the paddles 2 are moved outwards. The movable caps 4 are made of lightweight composites and malleable deformable alloys.

To provide a high pressure jet from the ADF device 100, a series of aerodynamically curved blades 602 are individually created and radially positioned about the geometric center of the ADF device 100, a process referred to as streamlining construction, which resulted from the controlled increase/decrease in the volume of processed air by the ADF 100. The curved blades 602 are made of lightweight composite materials and malleable deformable alloys.

In an embodiment, the ADF device 100 has two working phases: (i) Work Phase A (or the closed phase), which is the geometric form of a conventional ducted fan with the addition of a chevron cover as described herein and (ii) Work Phase B (or the opened phase), in which an even number of paddles along with other secondary mechanisms are adjusted to ensure the increase of the air mass, which may be approximately processed twice.

The even number of paddles 2 whose shape is a curved aerodynamic profile at ¾ of its rope is revolved at 45° to obtain a light and rigid cavity body with an optimal number of fasteners to not overburden the mass of the ADF device 100, which provides substantial advantages over prior designs by making the propulsion system adaptable and more efficient. The paddles 2 are made of light composite materials and malleable deformable alloys.

The paddles 2 are arranged side by side at their openings. When in Phase B, the paddles 2 form a diffuser inlet that accelerates the air masses to the propeller 37. When closed in Phase A, the paddles 2 take an overlapping array arrangement. The opening/closing process is performed in an automatic cycling mode which in an embodiment lasts for about three seconds.

There are two groups of paddles 2 in the closed phase. A first group 1002 of paddles 2 is located directly adjacent to the internal tube 1 and another group 1004 of paddles 2 is in the immediate proximity of the paddles group 1002, occupying the minimum space of arrangement.

In an embodiment, two types of individual kinematic guide plates 21, 22 are used that differ only through the profile of their respective tracks, and made up depressions. These guide plates 21, 22 may be arranged in an alternating arrangement such that no guide plate 21, 22 is adjacent to a guide plate 21, 22 of the same profile. The geometry of the guide plates 21, 22 is individually tailored according to the assigned mechanical requirements of the paddles 2 during their transition from Phase A to B and vice versa. The guide plates 21, 22 are made of polymers, composites, and metals.

A concentric disk-section segment of the inner tube 1 repeats the radius of the internal tube 1; it has two plane surfaces with threaded joints that support the mass and physical loads of the kinematic momentum and 70% of the elements that describe it. The board is made of slightly malleable light alloys, polymers, and composite material.

Each of these embodiments and obvious variations thereof are contemplated as falling within the spirit and scope of the claimed invention, which is set forth in the following claims. Moreover, the present concepts expressly include any and all combinations and sub-combinations of the preceding elements and aspects. The present disclosure is not limited to the specific illustrated example but extends to alternative embodiments, other shapes and/or configurations in accordance with the knowledge of one of ordinary skill in the art applied consistent with the presently disclosed principles.

What is claimed is:

1. An adaptive ducted fan propulsion system comprising:
a cavity tube that serves a resistance and support structure, wherein an interior surface of the cavity tube comprises a revolving surface of an aerodynamic profile and an exterior surface of the cavity tube comprises an extruded surface comprised of one or more planar surfaces;
a cover surrounding at least a portion of the cavity tube, the cover comprising one or more elongated sinusoidal-shaped pieces;

a plurality of movable caps each mounted to the cavity tube and having a convex shape;

one or more aerodynamically curved blades, each radially positioned within the cavity tube; and a plurality of movable paddles each having a curved aerodynamic profile, the plurality of movable paddles arranged such that in an open configuration, consecutive ones of the plurality of paddles are side-by-side and in a closed configuration, consecutive ones of the plurality of paddles overlap one another.

2. The adaptive ducted fan propulsion system of claim 1, wherein the plurality of paddles comprises a first group located directly adjacent to the cavity tube and a second group located adjacent to the first group and separated from the cavity tube by the first group.

3. A propulsion system comprising:
a hollow cylinder, the hollow cylinder comprising an interior volume within an outer shell and a central volume, wherein the outer shell comprises:
a cover comprising one or more elongated sinusoidal-shaped pieces; a plurality of movable caps each having a convex shape; and
one or more interior panels;
one or more blades radially positioned within the central volume; and
a plurality of paddles, the plurality of paddles being movable between a first configuration in which the paddles are contained in the interior volume and a second configuration in which the paddles surround an opening to the central volume, wherein each of the plurality of paddles is configured to move along a respective one of the one or more interior panels when transitioning from the first configuration to the second configuration.

4. The propulsion system of claim 3, wherein in the first configuration, consecutive ones of the plurality of paddles overlap one another.

5. The propulsion system of claim 3, wherein in the first configuration the plurality of paddles comprises a first group of paddles proximate the central volume and a second group of paddles separated from the central volume cavity tube by the first group of paddles.

6. The propulsion system of claim 3, wherein the paddles are movable to a third position that is intermediate to the first position and the second position.

7. The propulsion system of claim 3, wherein the plurality of movable caps are movable to permit access to the interior volume.

8. A propulsion system comprising a hollow cylinder, the hollow cylinder comprising an interior volume within an outer shell and a central volume, wherein the outer shell comprises:
a cover comprising one or more elongated sinusoidal-shaped pieces;
a plurality of moveable caps each having a convex shape;
one or more interior panels;
one or more blades radically positioned within the central volume;
a plurality of paddles, the plurality of paddles being movable between a first configuration in which the plurality of paddles are contained in the interior volume and a second configuration in which the plurality of paddles surround an opening to the central volume; and
a plurality of support plates each rotatably connected to one or more of the plurality of paddles.

9. The propulsion system of claim 8, further comprising a plurality of actuators, wherein each of the plurality of actuators is operatively connected to one of the plurality of support plates.

10. The propulsion system of claim 9, wherein the plurality of actuators are threaded and configured to rotate and wherein rotation of the plurality of actuators causes the plurality of support plates to move from proximate a first end of the hollow cylinder to proximate a second, opposite end of the hollow cylinder.

11. The propulsion system of claim 10, wherein a controller is communicatively coupled to the actuators and is configured to control the rotation of the actuators.

12. The propulsion system of claim 8, wherein each of the plurality of support plates is slidably connected to at least one of the one or more interior panels.

* * * * *